Aug. 28, 1928.
A. T. KELLER
1,682,378
OPEN HEARTH FURNACE
Filed Dec. 5, 1921
2 Sheets-Sheet 2
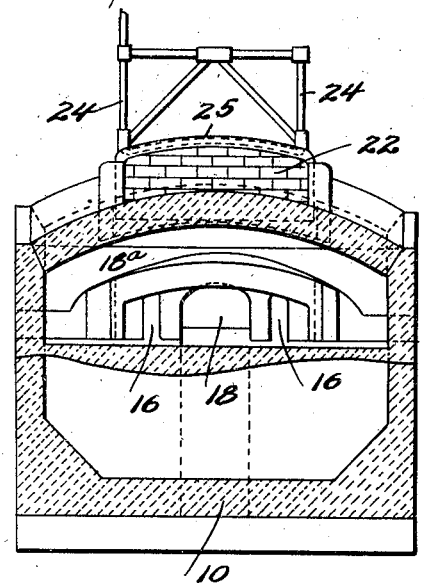
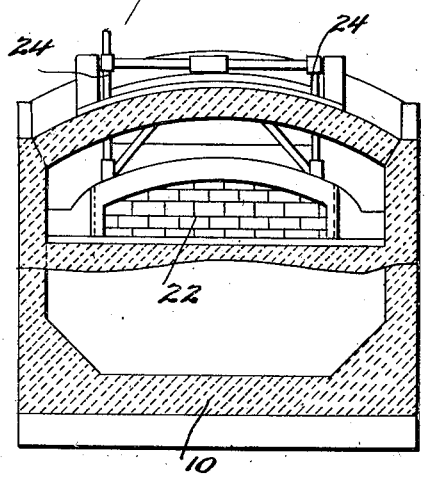

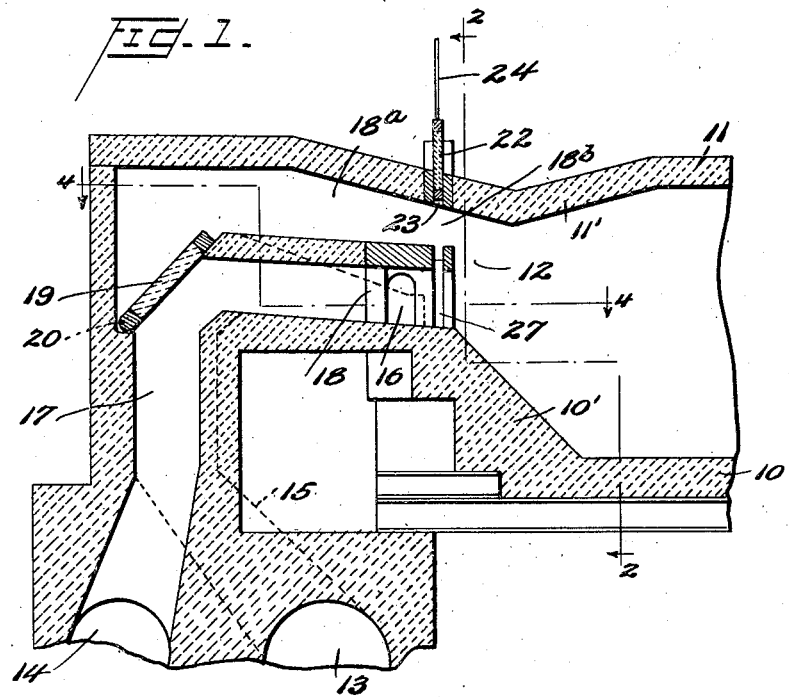
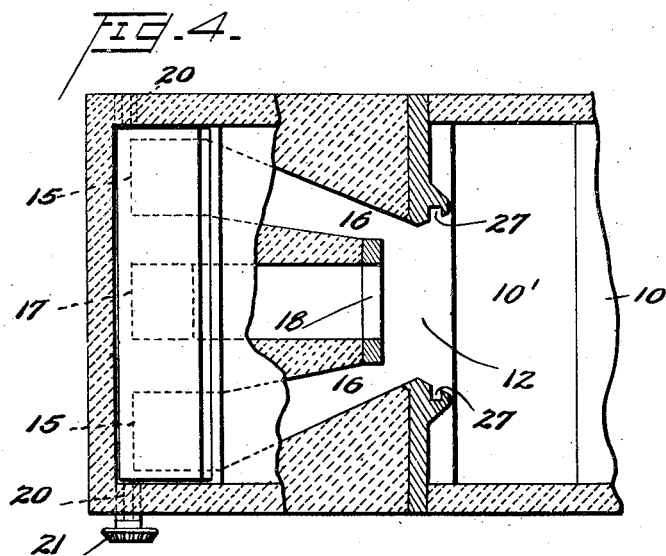

Patented Aug. 28, 1928.

1,682,378

UNITED STATES PATENT OFFICE.

ALBERT T. KELLER, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

OPEN-HEARTH FURNACE.

Application filed December 5, 1921. Serial No. 520,041.

This invention relates to regenerative reverberatory furnaces and particularly to furnaces of this class used in the manufacture of steel by the open-hearth process.

The object of the invention is to provide a furnace having an improved end construction permitting the combustible mixture to be introduced at the inlet end of the furnace at a relatively high velocity, and at the same time providing an outlet of ample effective area at the discharge end of the furnace to conduct away the hot products of combustion without checking the draft through the furnace, and without necessitating the use of the gas and air ports as outlet ports.

The invention may be embodied in various forms, one of which is illustrated in the accompanying drawings, in which:

Figure 1 is a vetrical longitudinal section through one end of an open hearth furnace having the improvements incorporated therein;

Figure 2 is a section on line 2—2 of Figure 1;

Figure 3 is a similar view but showing certain of the parts in different positions; and Figure 4 is a section on line 4—4 of Figure 1.

The hearth of the furnace is indicated at 10 and its reverberatory roof at 11, the end portion 10' of the hearth sloping upwardly and the end portion 11' of the roof sloping downwardly toward the throat 12 through which the gas and air flow into the combustion chamber at the inlet end of the furnace through which the products of combustion flow at the outlet end of the furnace (both ends of the furnace being preferably similarly constructed). Flues leading to air and gas regenerative chambers are indicated at 13 and 14 respectively, the air flue 13 being connected by two uptakes 15 with the combustion chamber, these flues turning forwardly and terminating in air ports 16 in the throat 12. The gas flue 14 is connected by an uptake 17, which is substantially parallel to flues 15, with the gas outlet port 18 located centrally and lying between air ports 16. The roof of the furnace in rear of the throat 12 is spaced above the flues 15 and 17 so that a channel 18ª is provided, which channel opens into the throat 12 through a port 18ᵇ having a relatively large effective area preferably greater than the combined areas of ports 16 and 18, as illustrated in Figure 3, and which channel also connects at its rear end with each of uptakes 15 and 17. A damper 19 controls communication between channel 18ª and the air and gas flues, this damper being rigidly mounted on the horizontal rod 20 which is rotatably supported in the side walls of the furnace. The rod 20 is provided at one end with a gear 21 which may be operated by any suitable means, to open and close the damper.

When the end of the furnace illustrated constitutes the end through which the incoming gas and air are introduced the damper 19 is closed as shown in Figure 1, but when the furnace is reversed and the end illustrated constitutes the outlet end the damper is opened so that the products of combustion are free to pass through channel 18ª and into the flues 15 and 17 and thence to the regenerating chambers. When air and gas are passing to the furnace through uptake flues 15 and 17 respectively, the air streams converge and impinge shortly after issuing from the ports 16, on the stream of gas flowing through port 18 so that a combustible mixture is formed as the gases pass through the throat into the combustion chamber.

To protect the ports 16 and 18 from the extremely hot outgoing products of combustion which would tend to destroy them, a damper 22 is provided, which damper may be raised and lowered through a slot 23 in the roof of the furnace. It is raised at the furnace end which is serving as an inlet end and is lowered at the end serving as the outlet end. This damper is hung by vertical rods 24 from suitable raising and lowering mechanism (which is not illustrated), these rods being hollow and communicating at their lower ends through a horizontal pipe 25 so that cooling water may be circulated through them to prevent their burning out when subjected to the intense heat at the outlet end of the furnace. When lowered, the vertical edges of the damper are received in vertical grooves 27 so that no leakage of the products of combustion occurs around the ends of the damper and through ports 16 and 18.

The provision of damper 19 and channel 18ª enables the outlet end of the furnace to conduct away the products of combustion without checking the draft through the furnace, even when the air and combustible gas supplied, or either of them, is under pressure, and obviates the necessity of allowing the produces of combustion to escape through the ports 16 and 18 which would result in their being burned out so that they would not function properly as inlet ports.

The invention may be embodied in furnaces of different design and is not limited in its scope to any particular design or arrangement of parts, within the scope of the appended claims.

It will be understood that by the word "hearth" used in the appended claims to indicate the chamber into which the throat opens is meant "combustion chamber". The combustion chamber is the chamber between the throats of the furnace and enclosed by the roof 11, 11', the hearth proper 10, 10' and the side walls.

Having thus described the invention what I claim as new and desire to secure by Letters Patent is:

1. A regenerative open hearth furnace end construction having two uptake flues and three ports opening into the hearth, each flue being adapted to communicate with the hearth through two of said ports, and a single damper for controlling communication between both of said flues and one of said ports.

2. A regenerative open hearth furnace end construction having two uptake flues and three ports opening into the hearth, one of said ports having an effective area greater than the combined areas of the other two, and comprising an outlet port for products of combustion, each of said flues being adapted to communicate with the large port and with one of the smaller ports, and a single damper for controlling communication between the two uptake flues and the large port.

3. A regenerative open hearth furnace end construction having two uptake flues and three ports opening into the hearth, one of said ports having an effective area greater than the combined areas of the other two, and comprising an outlet port for products of combustion, each of said flues being adapted to communicate with the large port and with one of the smaller ports, and a single damper disposed transversely of the furnace and arranged to rotate about a horizontal axis, for controlling communication between the two uptake flues and the large port.

4. An end construction for regenerative open hearth furnaces having a channel for gaseous fuel, two channels for air, and a channel for products of combustion, all of said channels communicating with the hearth, and a damper adapted to be interposed between the hearth and the outlet ports of the gas and air channels to protect the same from the products of combustion.

5. An end construction for open hearth furnaces having air and gas channels including air and gas ports disposed substantially horizontally and terminating adjacent the end of the combustion chamber, a separate port for products of combustion leading from the combustion chamber, and means for blocking the terminal ends of the air and gas ports to protect the same against the action of hot products of combustion.

6. An end construction for open hearth furnaces having air and gas channels including air and gas ports disposed substantially horizontally and terminating adjacent the end of the combustion chamber, both ports discharging through a common opening into the combustion chamber, a separate port for products of combustion leading to the combustion chamber, and means for blocking said common opening to prevent egress therethrough of hot products of combustion.

7. An end construction for open hearth furnaces having air and gas channels including air and gas ports disposed substantially horizontally and terminating adjacent the end of the combustion chamber, a separate port for products of combustion leading from the combustion chamber, said last mentioned port being above the gas and air ports, and means for blocking the terminal ends of the air and gas ports to protect the same against the action of hot products of combustion.

8. The combination set forth in claim 7 in which said means comprises a damper movable in a vertical plane into and out of the furnace through an aperture in the roof thereof.

9. The combination set forth in claim 7 in which two separate air ports are provided, positioned on opposite sides of the gas port respectively, all of said ports discharging through a common opening, and in which the said means comprises a damper movable in a vertical plane for blocking the said opening.

10. The combination set forth in claim 7 in which said means comprises a damper having a suspending device including water cooled members normally exposed to the flow of hot products of combustion when the blocking means is in blocking position.

11. An end construction for open hearth furnaces having a horizontally disposed fuel discharge port terminating in a discharge aperture adjacent the end of the combustion chamber, a separate port for products of combustion leading from the combustion chamber, and means for blocking the fuel discharge aperture to prevent the egress therethrough of products of combustion.

In testimony whereof I hereunto affix my signature.

ALBERT T. KELLER.